W. WILSON.
FLAT KNITTING MACHINE.
APPLICATION FILED JULY 22, 1915.
1,297,626.
Patented Mar. 18, 1919.
8 SHEETS—SHEET 3.
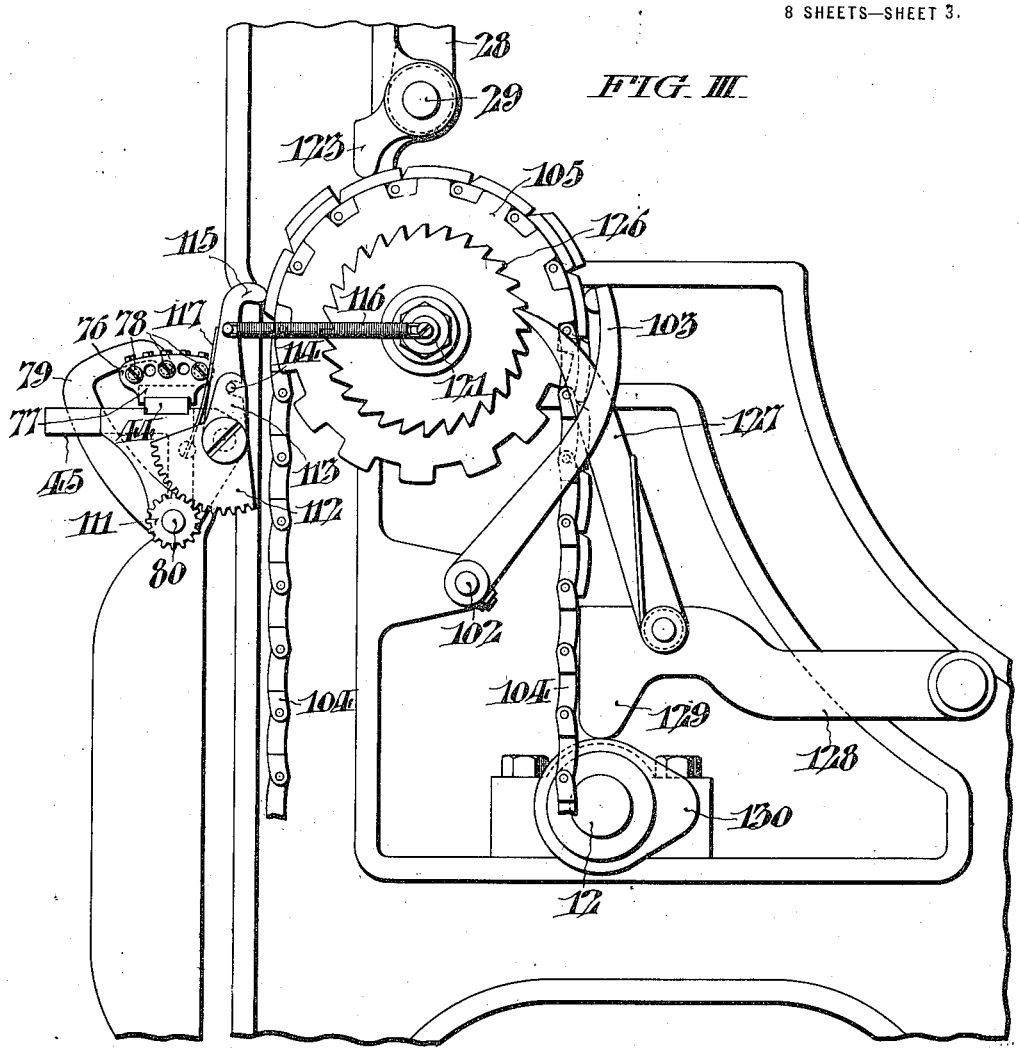
FIG. III.
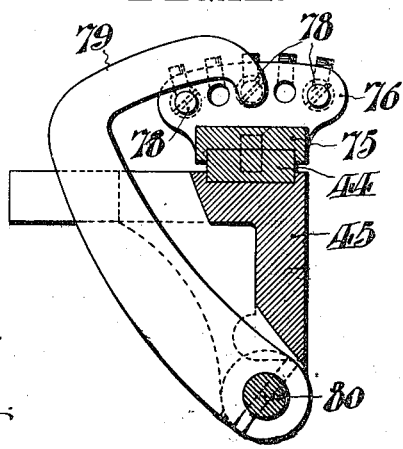
FIG. XI.
Witnesses
John C. Bergner
James H. Bell
Inventor
Wallace Wilson
by Finley & Paul
Attorneys W. WILSON.
FLAT KNITTING MACHINE.
APPLICATION FILED JULY 22, 1915.
1,297,626.
Patented Mar. 18, 1919.
8 SHEETS—SHEET 4.
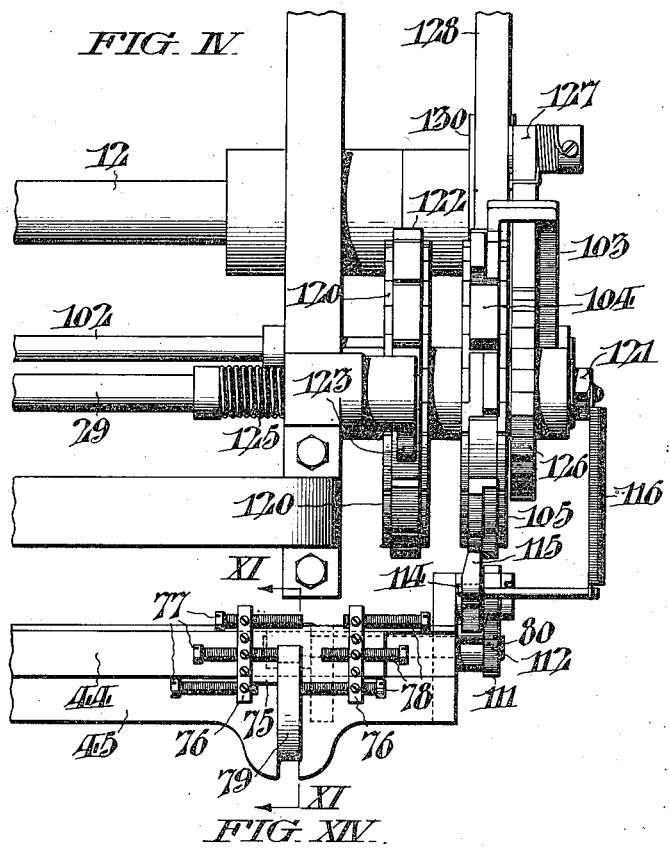
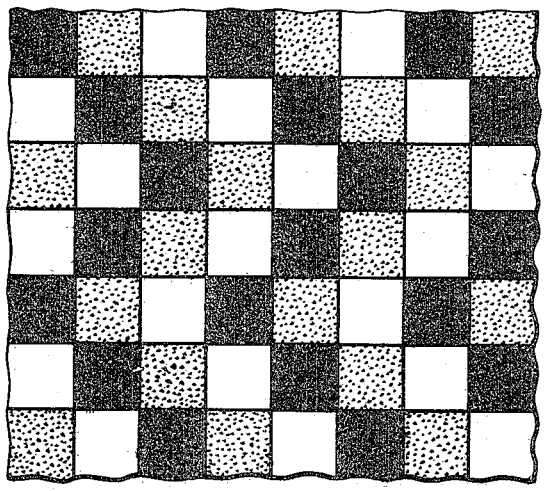
Witnesses
John C. Bergner
James H. Bell
Inventor
Wallace Wilson,
by Finney & Paul
Attorneys

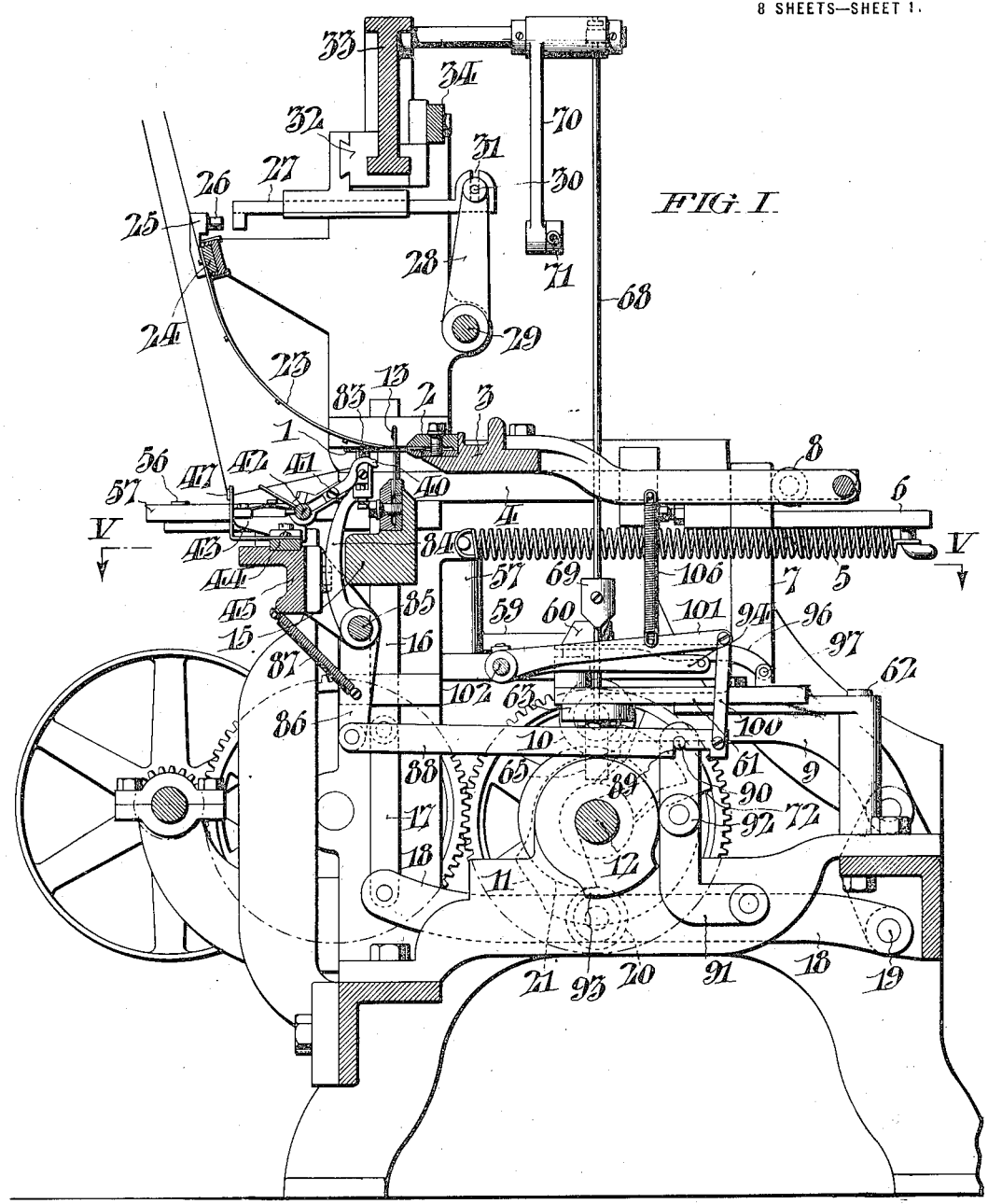

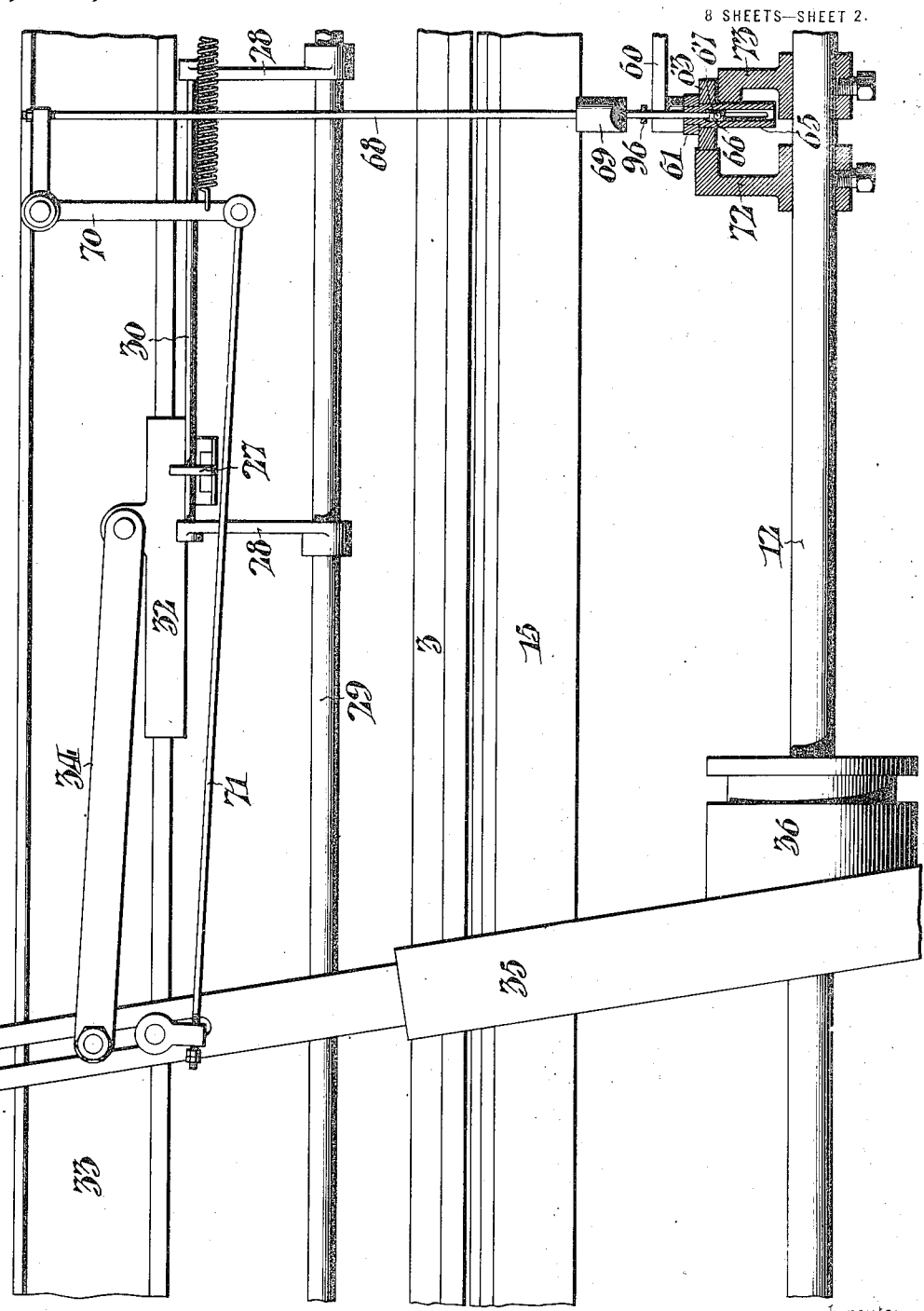

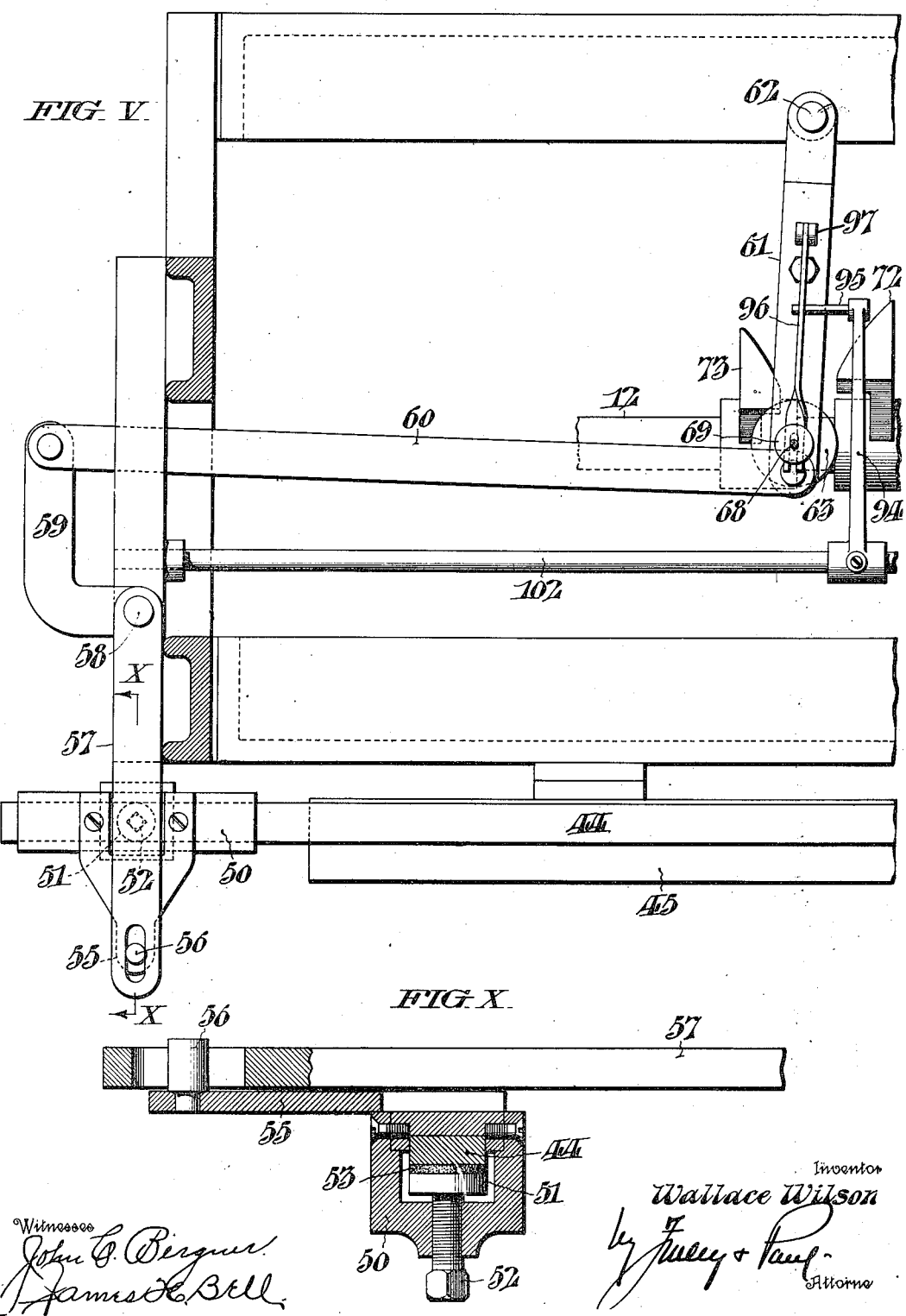

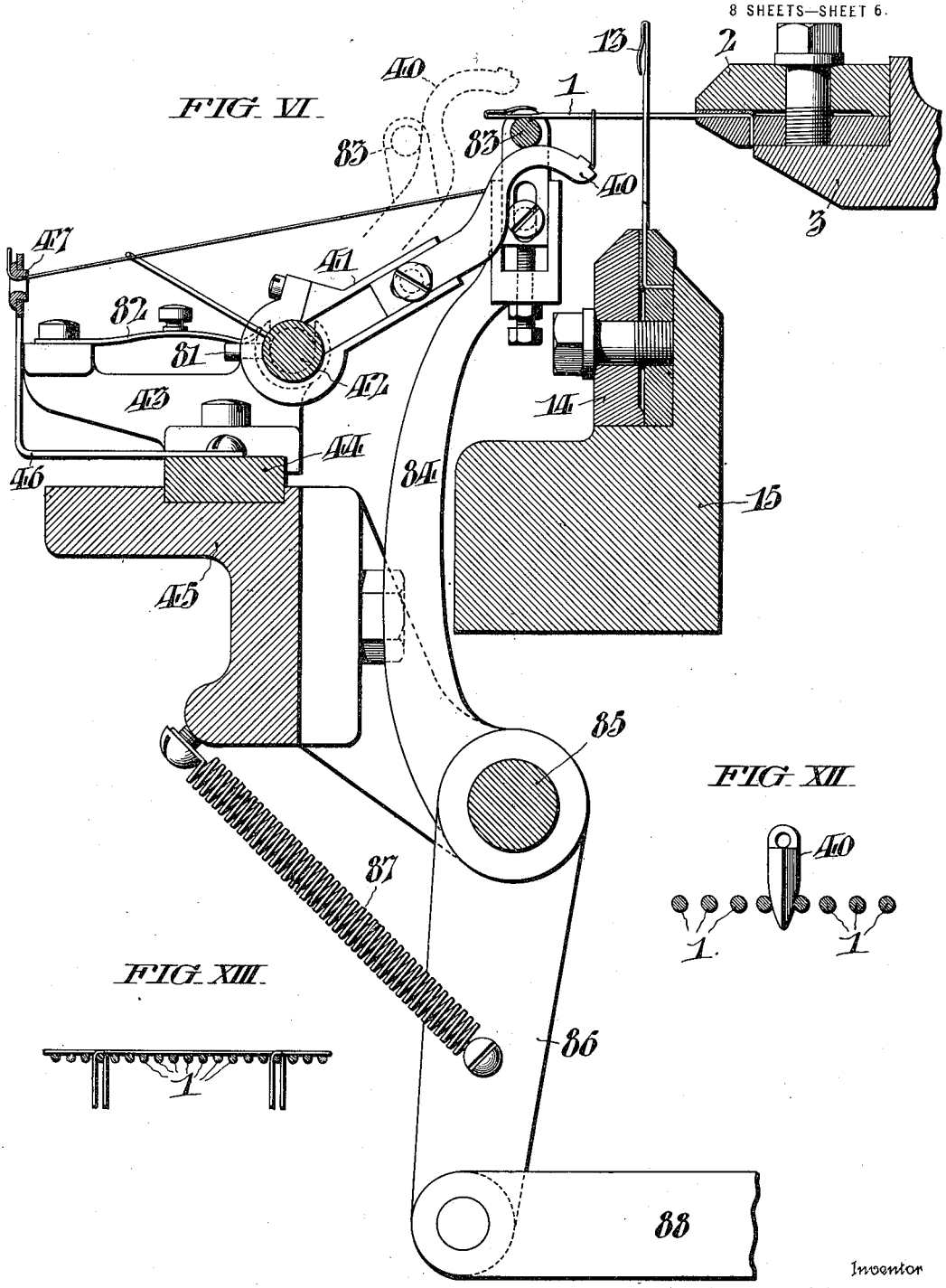

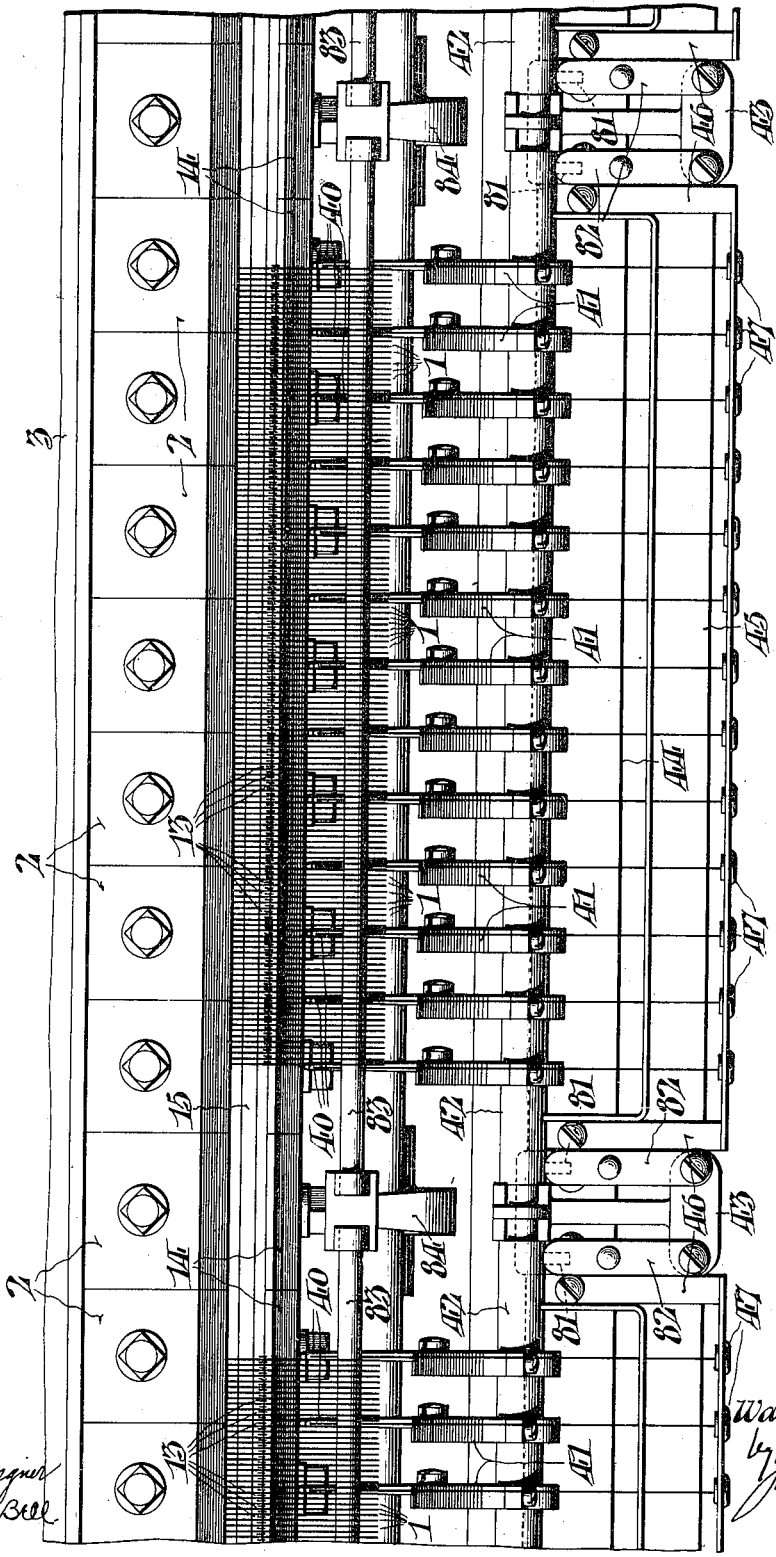

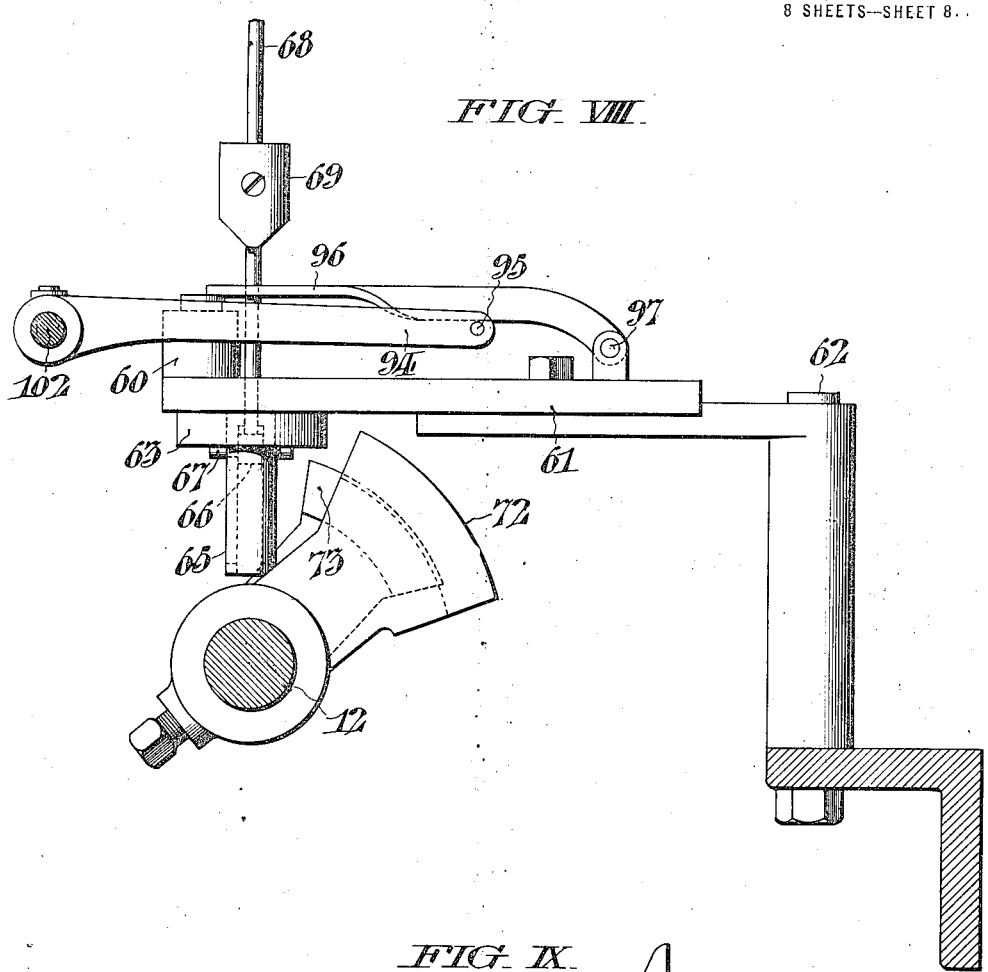
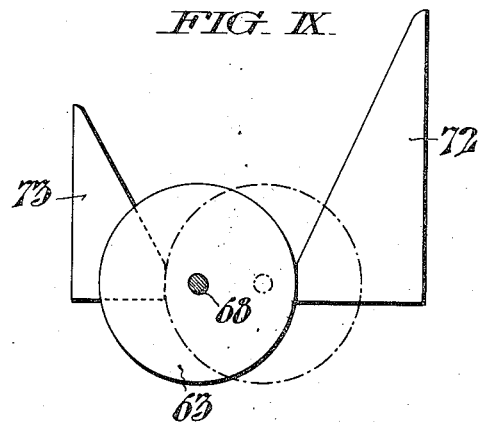

UNITED STATES PATENT OFFICE.

WALLACE WILSON, OF PHILADELPHIA, PENNSYLVANIA.

FLAT-KNITTING MACHINE.

1,297,626.	Specification of Letters Patent.	Patented Mar. 18, 1919.

Application filed July 22, 1915. Serial No. 41,216.

*To all whom it may concern:*

Be it known that I, WALLACE WILSON, of Philadelphia, in the county of Philadelphia and State of Pennsylvania, have invented certain new and useful Improvements in Flat-Knitting Machines, whereof the following is a specification, reference being had to the accompanying drawings.

My improvements relate to flat knitting machines with both horizontal and vertical needles and with multiple feeds of limited traverse, by the reciprocation of which pattern effects may be produced. My invention relates chiefly to the control of the feeds whereby various patterns may be produced.

I have utilized my invention in the production of pattern effects in the manufacture of hosiery, and have embodied my invention in a compound flat knitting machine, in which a number of stocking legs are knit simultaneously side by side, but it will be understood that the scope of my invention is not thus limited.

In the accompanying drawings, Figure I, is a vertical sectional view through a knitting machine, conveniently illustrating the adaptation of my invention thereto.

Fig. II, is a partial rear elevation of the machine illustrating more particularly the mechanism for reciprocating the thread feeds.

Fig. III, is a partial end elevation of the machine showing the pattern controlling mechanism.

Fig. IV, is a partial plan of the machine, illustrating more particularly the correlation of the parts shown in Fig. III.

Fig. V, is a fragmentary plan view of the machine, taken on the line V, V, of Fig. I, illustrating the shifting mechanism for the pattern thread feeds.

Fig. VI, is an enlarged vertical sectional view showing the correlation between the vertical and horizontal needles, and the pattern feed fingers.

Fig. VII, is a detail plan view of the parts shown in Fig. VI.

Fig. VIII, is a detail sectional view showing some of the parts of the pattern feed shifting mechanism.

Figs. IX, and X, are further details of this shifting mechanism, the latter figure being a sectional view taken on the line X, X, of Fig. V.

Fig. XI, is a detail section on line XI, XI, of Fig. IV, showing the limiting stop mechanism for the pattern feed reciprocating bar.

Fig. XII, illustrates the method of depressing the pattern feed fingers between two adjacent needles.

Fig. XIII, illustrates the method of overlapping the feeding of the threads upon the end needles of adjacent groups.

Fig. XIV, is a diagrammatic view of a simple form of pattern knit according to my invention.

In order to facilitate the description of my invention, I will sub-divide it by describing in order certain groups of mechanism, as follows:

(*a*) The mechanism for controlling the advance and retraction of the banks of needles.

(*b*) The mechanism for controlling the reciprocation of the foundation thread.

(*c*) The mechanism for controlling the reciprocation of the pattern feeds.

(*d*) The mechanism for depressing the pattern feeds between selected needles.

(*e*) The mechanism for effecting alterations in the relation between the pattern feeds and the needles so as to vary the set of needles served by any one feed.

(*f*) The pattern mechanism by which the variations of the feeds are governed.

In the accompanying drawings, I have shown my invention as applied to a compound machine involving the duplication of many of the parts, according to the number of similar knit webs which it is desired to simultaneously produce. It will be sufficient to describe so much of the machine as has to do with the knitting of a single web, that is to say, so much as is produced by the coöperation of the horizontal bank of about one hundred and thirty to one hundred and fifty needles, and the vertical bank of a similar number of needles shown in the central portion of Fig. VII.

(*a*) The mechanism for controlling the advance and retraction of the banks of needles.

The horizontal needles 1, are spring beard needles, and are set by means of clamps 2, upon a needle bar 3, to which horizontal translation is imparted under the guidance of a pair of slides, one of which is shown at 4, in Fig. I. The bar 3, is secured to these slides and the needles projected under the tension of coiled springs 5, spanned between fixed anchorages and extensions 6, secured to the slides 4. The retraction of the needles is effected by contact of arms 7, with rollers 8, fixed to the slides 4. The arms 7, are integral parts of pivoted levers 9, upon the free extremity of which are rollers 10, set within the planes of rotary cams 11, set upon the main shaft 12, so that the cams control the backward translation of the horizontal needles against the tension of the springs 5, which otherwise throw them forward.

The vertical needles 13, are similarly fixed by clamps 14, to a needle bar 15, which is elevated by the thrust of slides 16, pivoted at their lower ends to links 17, the other ends of which are in turn pivoted to the swinging arms 18, fulcrumed at 19, and carrying rollers 20, set within the planes of cam disks 21, also mounted upon the main shaft 12. Thus the rotation of this shaft effects the reciprocation in proper relation of all the needles both horizontal and vertical at the required intervals to perform the knitting operation upon the thread or threads laid as hereinafter described upon the horizontal needles.

(b) The mechanism for controlling the reciprocation of a foundation thread.

The thread feed 23, corresponding to a bank of horizontal and vertical needles is set upon a slide bar 24. This slide bar carries an arm 25, with a projecting pin 26, capable of engagement by the bifurcated end of the slide rod 27, the engagement being effected by the sliding of the rod 27, under the throw of levers 28, set upon the rock shaft 29, which is controlled by a pattern chain hereinafter described. As shown in Fig. II, these levers 28, support between them at their outer ends a rod 30, which is engaged by a notch 31, formed in the slide rod 27. In Fig. I, the parts are shown as disengaged, but supposing them to be in engagement the traverse of the thread guide is effected as follows:

The slide rod 27, is mounted in a carriage 32, sliding freely upon the transverse beam 33, supported lengthwise over the banks of the needles. The traverse of the carriage is effected by the link 34, pivoted at one end to the carriage and at the other with capacity for adjustment to the swinging arm 35, which is pivoted at its lower end, not shown, and derives a swinging motion by means of engagement with a cam groove in the disk 36, set on the main shaft 12.

By the coöperation of the parts which have thus far been described, depending upon the relative positions in which the various cams are set on the shaft 12, there results the requisite lateral motion of the thread feed 23, in relation to both banks of needles, and the requisite motion of these needles to effect the continuous knitting of a web upon the entire bank of needles, and for the knitting of such ribbed web, only the parts thus far described are requisite. By the disengagement of the connection between the pin 26, and the bifurcated extremity of the rod 27, by the means before explained, the feed which I have referred to as the foundation feed, may, if desired, be thrown out of action in order to permit the knitting to be entirely performed by the pattern feeds which I am now about to describe, but if desired, the foundation feed and the pattern feeds may be simultaneously operated for the production of plaited or other reinforced knitting.

(c) The mechanism for controlling the reciprocating of the pattern feeds.

There are a number of these pattern feeds to each bank of needles. I have shown each of these banks as provided with thirteen successive and complementary feeds. By these terms I mean that these feeds succeed each other in direct succession, and they are so spaced having regard to their field of operation that together they knit a complete web. All of the feeds are simultaneously and similarly operated so as to reciprocate over a predetermined number (which I will term a set), of needles and the relation between the traverse of the feeds and their distance apart is so adjusted that at least one needle at the extremity of each set takes thread from two feeds, so as to effect the interknitting of the webs which otherwise would be separately formed by each set (see Fig. XIII). These pattern feeds 40, are mounted with capacity for adjustment in arms 41, set upon the pivot rod 42, which is held with capacity for a rocking motion in brackets 43, set upon the traversing bar 44, which extends the entire length of the machine, sliding in a seat in the guide beam 45. The bar 44, also carries the arms 46, with their appropriate thread eyes 47, to guide the threads which are passed to the feeds 40. The reciprocation of the bar 44, is effected as follows:

Referring more particularly to Figs. V, and X, upon one end said traversing bar 44, carries a clamp yoke 50, which surrounds it and to which it is yieldingly attached by the pressure of the head 51, of the screw 52, which may be set so as to create a desired degree of yielding pressure between the clamp yoke and the bar 44, a friction facing 53, being interposed to permit the sliding of the two in relation to each other when influenced by a force greater than that exerted by the pressure screw. This clamp yoke 50, has an extension 55, carrying a pin 56, which engages a slot at the end of the lever 57, pivoted to the machine frame at 58. The other arm 59, of the lever 57, is connected by a link 60, to the end of the swinging arm 61, fulcrumed about the fixed pivot 62. The swing of the latter arm 61, is effected by means of a roller 63, which is set with capacity for vertical adjustment in relation to the arm 61. To this end, the roller 63, slides vertically upon the supporting stud 65, see Figs. II, and VIII, which is fixed in the lever 61, and bored axially to receive a small head 66, with a pin 67, set therein and projecting through vertical slots in the stud, so as to contact with the lower side of the roller 63. This head is attached to a vertical rod 68, weighted at 69, and attached at the upper end to a bell crank lever 70, the other arm of which is connected to a link 71, which is attached at its other end with capacity for adjustment, near the end of the lever 35, and is by it given a translation to effect the raising and lowering of the roller 63, so as to bring it within the plane of one or other of two rotary cams 72, and 73, set upon the shaft 12, and having limited cam surfaces as seen particularly in Figs. VIII and IX. According as the roller 63, is in its upper or lower position, it comes into contact with these cam surfaces and there is thereby imparted to all of the pattern threads a traverse across the needles with which they coöperate. The threads are laid across the horizontal bank of needles thus permitting the use of a very mild tension. This is important where ribbed knitting is to be effected by the simultaneous (as distinguished from successive) action of two banks of needles. The extent of the traverse of these feeds is subject to control as follows:

The yoke frame 50, as has been explained is capable of sliding in relation to the bar 44. At the other end the bar 44 carries a bracket 75, with parallel plates 76. Set within the plates are set screws 77, and 78 arranged in opposing pairs, and between the ends of these pairs of set screws is a stop finger 79, mounted upon the rock shaft 80, journaled in the guide beam 45, (see Figs. III, IV, and XI). As the pairs of set screws are located in different planes with respect to each other, the limitation of the traverse of the bar 44, will depend upon the position of the stop finger between them and this is determined by a pattern chain as will be hereinafter described.

(*d*) The mechanism for depressing the pattern feeds between selected needles.

In addition to the reciprocation of the pattern feeds as has been described, it is necessary that each feed at the end of each reciprocation shall temporarily sink its thread between the needles until the movement of the needle bars shall have involved the thread in the knitting. This is accomplished as follows:

Each of the feeds 40, is set upon the rock bar 42, in which are set pins 81, against which press tension springs 82, which normally tend to hold the feeds in their uppermost position, as shown by the dotted lines in Fig. VI. Above the series of feeds and in contact with the back of all of them is a rod 83, set with capacity for vertical adjustment between arms 84, secured upon a rock shaft 85, which carries a lever 86, which swings between the tension of a spring 87, and link 88, which is provided near the other end with a notch 89, within which rests the pin 90, set in the swinging lever 91, (see Fig. I). This lever has a roller 92, which is in the plane of a cam 93, set on the main shaft 12, so that the rotation of this shaft exerts at the proper time a pull upon the link 88, which swings the rod 83, against the tension of the springs 87, to the position shown in dotted lines in Fig. VI, after which the spring tension restores it to the position of the drawings, in which it simultaneously depresses all of the feeds 40. In order to facilitate this passing of the feeds between the needles each feed is tapered at its lower edge as shown in Fig. XII.

The operation of the cam 93, to thus simultaneously depress the thread feeds may be caused to intermit by breaking the connection between the link 88, and the arm 91. This is accomplished as follows:

The link 88, is pivoted at its extremity to a link 100, which is in turn pivoted to the arm 101, set on the rock shaft 102, which carries at one end, the finger 103, the free extremity of which rests against an outer portion of the links of the pattern chain 104, carried by the sprocket 105, (see Fig. III.) When this finger is in contact with the high outer side of the links as shown in said figure it presses the rock shaft 102, against the tension of the spring 106, (see Fig. I), to the position in which the notch of the link 88, is engaged with the pin 90, of the lever 91, as shown, but when the high links have passed from beneath the finger 103, the spring is free to lift the link 88, out of engagement with the pin 90, on the lever 91, and to effect intermission of the depression of the feeds.

This mechanism also serves to simultaneously control the reciprocation of the traversing bar 44, in the following manner:

The rod 102, also carries a lifting finger 94, (see Fig. VIII), having at its outer end a pin 95, which engages a lever 96, fulcrumed at 97, to the swinging arm 61, (see Figs. V, and VIII). This lever is forked at its outer end for the reception of the rod 68, and serves to lift the said rod by engaging the lower end of the weight 69. When the finger 103, drops from the high links on the chain 104, the rod 68, is thus elevated and maintained in this position, thereby preventing any further action of the cams 72, and 73, upon the roller 63, and in this manner arresting the traverse of the feed bar 44.

(*e*) The mechanism for effecting alterations in the relation between the pattern feeds and the needles so as to vary the set of needles served by any one feed.

It has been explained that the traverse of the slide bar 44, is limited by the positions of the opposing set screws 77, and 78, of which there are three pairs shown in Figs. IV and XI. If desired there may be more pairs and for this purpose it will be noticed that there are additional threaded apertures shown in Figs. III, and XI, for the insertion of such set screws, although none are shown in place in the figures. The relations of the space betwen the ends of the opposing screws are so adjusted that the position of the start and finish of the reciprocatory motion of the slide bar 44, may be varied according to which set of screws oppose the end of the finger 79, and this depends upon the position of said finger which is mounted upon the rock shaft 80, which carries a pinion 111 (see Fig. III), which engages a sector 112, which carries on the far side of its pivot a projection 113, carrying a pin 114, which engages a notch on the side of the pivot finger 115. The extremity of the finger 115, is in contact with the inner sides of the links of the pattern chain shown in Fig. III, and as there shown, said inner sides have three different heights, and according as a different height is presented, the finger 115, is pressed in opposition to the pull of a spring 116, so as to vary the position of the stop finger 79, and shift it from a position between one pair of set screws to a position between another pair, with a corresponding variation in the position of the feeds 40, in relation to the series of needles. For example, the pairs of set screws may be so adjusted as to cause the shifting of the stop finger to advance each feed to a position corresponding to the set of needles which had previously been served by an adjoining feed. Under these circumstances if each feed has been knitting yarn of a different color for a given number of courses, the shift thus occasioned will vary the position of the colors after the manner of a checker board pattern as shown in Fig. XIV, this being given merely as an example of an infinite number of pattern effects which can be secured by the device which I have explained. If desired, the succeeding shift may occasion a still farther advance of each feed of corresponding extent, in the same direction, as also illustrated in Fig. XIV, after which, as shown in said figure, the colors return step by step to their former positions.

A leaf spring 117, serves to maintain the pin 114, on the sector arm, in engagement with the notch in the finger 115, and is functional in affording a yielding connection between these parts and obviates breakage in the event of untimely shifting of the finger 79, from one pair of set screws to the other.

(f) The pattern mechanism by which the variations of the feeds are governed.

As shown in Figs. III, and IV, two sprocket wheels 105, and 120, are mounted to rotate freely on a stud 121, set in one of the end frames of the machine. The sprocket 105, has already been referred to, and carries the chain 104, which controls the pattern and also determines the activity or inactivity of the pattern feeds.

The control of the foundation yarn feed 23, is effected through the action of the links of a chain 122, carried by the sprocket 120, upon the finger 123, see Figs. III, and IV, which is fixed upon the outer end of the rock shaft 29, in a manner hereinbefore described. The engagement between the finger 123, and the chain 122, is maintained through the action of the spring 125, coiled about the rock shaft 29, as best seen in Fig. IV.

The sprockets are simultaneously and intermittently rotated through the instrumentality of a ratchet wheel 126, engaged by a pawl 127, which is spring-pressed and pivotally mounted upon the end of a lever 128. This lever receives its motion through contact of its projection 129, with a cam 130, secured upon the outer end of the main shaft as viewed in Fig. III.

It is to be understood that feeds such as 23, may be multiplied indefinitely for feeding variegated colored yarns, thereby affording means for producing horizontal stripes in the fabric in addition to the pattern produced by the feeds 40.

It will thus be seen that the machine which I have invented may be adapted to produce an endless variety of designs, both as to plain and plaited fabrics, depending upon the separate or simultaneous employment of the two independent sets of feeds.

Having thus described my invention, I claim:

1. In a machine of the class described, a bar mounted with capacity for endwise reciprocation, stops for limiting the extent of the reciprocatory motion, means for imparting reciprocation to said bar, a yielding connection interposed between said means and the bar, whereby the extent of said reciprocation is limited according to the position of the aforementioned stops, a rocking rod mounted on said bar, a series of thread carriers set upon said rod, a bank of needles in such relation to said thread carriers that reciprocation of the thread carriers determines the number of consecutive needles to which the thread is fed, while rotation of said rod causes the carriers to pass from one side of the bank of needles to the other.

2. In a machine of the class described, a series of yarn feeds mounted upon a common reciprocating traversing bar, a reciprocating member to which said traversing bar is attached with interposition of a yielding frictional clutch which permits lost motion when the movement of the traversing bar is otherwise limited, a series of paired separately adjustable limiting stops, by which a limit may be set to the movement of the traversing bar in each direction, and means subject to the control of pattern mechanism, for substituting one pair of stops for another pair, differing in position therefrom so as to alter the limits of the movement of the traversing bar.

3. In a machine of the class described, a series of yarn feeds mounted in fixed relation to each other upon a common traversing bar, a reciprocating member to which said traversing bar is attached with interposition of a yielding frictional clutch which permits lost motion when the movement of the traversing bar is otherwise limited, a series of paired independently adjustable limiting stops set upon the traversing bar, a movable finger interposed between one or other of said pairs of stops, whereby the movement of the traversing bar is limited in each direction, and means subject to the control of pattern mechanism for shifting said finger from a position between one pair of stops to a position between a different pair of stops.

4. In a flat knitting machine the combination of a rotating rod upon which a plurality of feeds are set, a traversing bar upon which said rotating rod is mounted with capacity for pivotal motion, means for accomplishing reciprocation of said traversing bar, including a yielding connection, parallel plates set upon said traversing bar, set screws in opposing pairs one in each plate, and a finger with capacity for movement whereby it may be interposed between one or other of said pairs, thus limiting the traversing motion according to the position in which the screws are set between which it is situated.

In testimony whereof, I have hereunto signed my name, at Philadelphia, Pennsylvania, this twentieth day of July, 1915.

WALLACE WILSON.

Witnesses:
JAMES H. BELL,
E. L. FULLERTON.